(12) United States Patent
Jang et al.

(10) Patent No.: US 12,169,917 B2
(45) Date of Patent: Dec. 17, 2024

(54) METHOD AND DEVICE WITH DATA PROCESSING USING NEURAL NETWORK

(71) Applicant: Samsung Electronics Co., Ltd., Suwon-si (KR)

(72) Inventors: Sujin Jang, Hwaseong-si (KR); Joohan Na, Suwon-si (KR); Dokwan Oh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/575,002

(22) Filed: Jan. 13, 2022

(65) Prior Publication Data
US 2022/0366548 A1    Nov. 17, 2022

(30) Foreign Application Priority Data

May 17, 2021  (KR) .................. 10-2021-0063699
Jun. 28, 2021  (KR) .................. 10-2021-0083974

(51) Int. Cl.
*G06T 5/80*        (2024.01)
*G06N 3/088*       (2023.01)
*G06T 5/50*        (2006.01)

(52) U.S. Cl.
CPC .............. *G06T 5/80* (2024.01); *G06N 3/088* (2013.01); *G06T 5/50* (2013.01); *G06T 2207/20081* (2013.01); *G06T 2207/20084* (2013.01)

(58) Field of Classification Search
CPC ... G06T 2207/10024; G06T 7/90; G06T 7/80; G06T 2207/20021; G06T 5/50;
(Continued)

(56) References Cited

U.S. PATENT DOCUMENTS 9,683,832 B2    6/2017  Wang et al.
10,602,032 B2   3/2020  Liu et al.
(Continued)

FOREIGN PATENT DOCUMENTS

CN   103338380 B   3/2015
CN   111105357 A   5/2020
(Continued)

OTHER PUBLICATIONS

Deng et al., "CNN based semantic segmentation for urban traffic scenes using fisheye camera," IEEE Intelligent Vehicles Symposium, 2017, pp. 231-236.
Deng et al., "Restricted Deformable Convolution based Road Scene Semantic Segmentation Using Surround View Cameras," IEEE Transactions of Intelligent Transportation Systems, 2019, 13 Pages.
Playout et al., "Adaptable Deformable Convolutions for Semantic Segmentation of Fisheye Images in Autonomous Driving System," arXiv, 2021, 10 Pages.
(Continued)

*Primary Examiner* — Aaron W Carter
*Assistant Examiner* — Courtney Joan Nelson
(74) *Attorney, Agent, or Firm* — NSIP Law (57) ABSTRACT

A processor-implemented method with data processing using a neural network includes: determining a first translated image by translating a first image based on a second image, the first image and a second image that having different distortions, such that a distortion of the first image corresponds to a distortion of the second image; determining a first retranslated image by translating the first translated image such that a distortion of the first translated image corresponds to a distortion of the first image; and training a first deformation field generator configured to determine a first relative deformation field that represents a relative deformation from the first image to the second image and a second deformation field generator configured to determine a second relative deformation field that represents a relative deformation from the second image to the first image, based on a loss between the first retranslated image and the first image.

20 Claims, 8 Drawing Sheets

(58) Field of Classification Search
CPC . G06T 2207/20084; G06T 2207/20048; G06T 3/047; G06T 5/10; G06T 7/30; G06T 7/33; G06T 5/60; G06T 5/80; G06T 2207/20081; G01N 15/1429; G02B 21/008; G06N 3/08; G06N 3/045; G06N 3/04; G06N 20/00; G06N 3/0464; G06N 3/088; G06V 10/751; G06V 10/763; G06V 10/82

See application file for complete search history.

(56) References Cited

U.S. PATENT DOCUMENTS

| | | | | |
|---|---|---|---|---|
| 11,087,435 | B1* | 8/2021 | Vivona | G06T 3/12 |
| 2007/0188633 | A1* | 8/2007 | Mandy | H04N 25/611 |
| | | | | 348/E5.079 |
| 2019/0102868 | A1* | 4/2019 | Beric | H04N 25/61 |
| 2019/0306383 | A1* | 10/2019 | Liu | H04N 23/81 |
| 2020/0034654 | A1* | 1/2020 | Mansi | G06N 3/084 |
| 2020/0202498 | A1* | 6/2020 | Raduta | G06T 5/80 |

FOREIGN PATENT DOCUMENTS

| | | |
|---|---|---|
| CN | 112561807 A | 3/2021 |
| KR | 10-1922964 B1 | 11/2018 |

OTHER PUBLICATIONS

Extended European Search Report issued on Sep. 19, 2022, in counterpart European Patent Application No. 22166297.6 (9 Pages).

Blott, Gregor, et al "Semantic Segmentation of Fisheye Images." *Proceedings of the European Conference on Computer Vision (ECCV) Workshops* 2018 (16 pages in English).

Yogamani, Senthil, et al. "Woodscape: A multi-task, multi-camera fisheye dataset for autonomous driving." *Proceedings of the IEEE/CVF International Conference on Computer Vision* 2019 pp. 9308-9318.

Mei, Ke, et al. "Instance Adaptive Self-Training for Unsupervised Domain Adaptation." *arXiv:2008.12197v1*, Aug. 27, 2020 (16 pages in English).

* cited by examiner

METHOD AND DEVICE WITH DATA PROCESSING USING NEURAL NETWORK

CROSS-REFERENCE TO RELATED APPLICATIONS

This application claims the benefit under 35 USC § 119(a) of Korean Patent Application No. 10-2021-0063699 filed on May 17, 2021, and Korean Patent Application No. 10-2021-0083974 filed on Jun. 28, 2021, in the Korean Intellectual Property Office, the entire disclosures of which are incorporated herein by reference for all purposes.

BACKGROUND

1. Field

The following description relates to a method and device with data processing using a neural network.

2. Description of Related Art

Machine learning may improve the performance of image recognition in an environment in which supervision of images and annotations are given. The images and annotations may need to be acquired for image recognition, and the acquisition may be performed based on rectilinear images that may be more readily available. However, a rectilinear image may have a limitation in terms of a field of view (FOV), for which a camera using a fisheye lens is introduced. A FOV of the fisheye lens may be less limited compared to a general lens for a rectilinear image. However, an image captured through the fisheye lens may have a deformation or distortion.

There may be a lack of annotations needed for training an inference model for such a deformed or distorted image. In addition, there may be a variety of deformations or distortions due to such lenses or cameras. Thus, directly generating an annotation may be difficult and/or inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with data processing using a neural network includes: determining a first translated image by translating a first image based on a second image, the first image and a second image that having different distortions, such that a distortion of the first image corresponds to a distortion of the second image; determining a first retranslated image by translating the first translated image such that a distortion of the first translated image corresponds to a distortion of the first image; and training a first deformation field generator configured to determine a first relative deformation field that represents a relative deformation from the first image to the second image and a second deformation field generator configured to determine a second relative deformation field that represents a relative deformation from the second image to the first image, based on a loss between the first retranslated image and the first image.

The method may include: determining a second translated image by translating the second image such that the distortion of the second image corresponds to the distortion of the first image; determining a second retranslated image by translating the second translated image such that a distortion of the second translated image corresponds to the distortion of the second image; and training the first deformation field generator and the second deformation field generator based on a loss between the second retranslated image and the second image.

An initial parameter of the first deformation field generator may be determined through training based on a loss between the first translated image and a third translated image determined from the first image based on a fisheye simulation.

The first relative deformation field and the second relative deformation field may have an inverse deformation relationship.

The determining of the first translated image may include determining the first translated image having the distortion of the second image by applying the first relative deformation field to the first image.

The determining of the first retranslated image may include determining the first retranslated image having the distortion of the first image by applying the second relative deformation field to the first translated image.

The first image and the second image may be unpaired images comprising either one or both of different contents and different scenes.

The training of the first deformation field generator and the second deformation field generator may include training the first deformation field generator and the second deformation field generator through unsupervised learning without information associated with the distortions of the first image and the second image.

The method may include training an inference model for the second image based on the first translated image and a translated label image determined by translating a label image corresponding to the first image such that a distortion of the label image corresponds to the distortion of the second image.

The method may include training an inference model for the second image through an unsupervised domain adaptation using the second image, a translated label image determined by translating a label image corresponding to the first image such a distortion of that the label image corresponds to the distortion of the second image, and a fourth translated image determined by translating the first image such that the distortion of the first image corresponds to the distortion and a texture of the second image.

The second image may have no corresponding label image.

In another general aspect, one or more embodiments include a non-transitory computer-readable storage medium storing instructions that, when executed by a processor, configure the processor to perform any one, any combination, or all operations and methods described herein.

In another general aspect, a processor-implemented method with data processing using a neural network includes: determining a relative deformation field that represents a relative deformation from a source image to a target image based on the source image and the target image that have different distortions; and determining a translated source image having a distortion of the target image by applying the relative deformation field to the source image.

In another general aspect, a device with data processing includes: one or more processors configured to: determine a first translated image by translating a first image based on a second image, the first image and a second image that having different distortions, such that a distortion of the first image corresponds to a distortion of the second image; determine a first retranslated image by translating the first translated image such that a distortion of the first translated image corresponds to a distortion of the first image; and train a first deformation field generator configured to determine a first relative deformation field that represents a relative deformation from the first image to the second image and a second deformation field generator configured to determine a second relative deformation field that represents a relative deformation from the second image to the first image, based on a loss between the first retranslated image and the first image.

The one or more processors may be configured to: determine a second translated image by translating the second image such that the distortion of the second image corresponds to the distortion of the first image; determine a second retranslated image by translating the second translated image such that a distortion of the second translated image corresponds to the distortion of the second image; and train the first deformation field generator and the second deformation field generator based on a loss between the second retranslated image and the second image.

An initial parameter of the first deformation field generator may be determined through training based on a loss between the first translated image and a third translated image determined from the first image based on a fisheye simulation.

The first relative deformation field and the second relative deformation field may have an inverse deformation relationship.

For the determining of the first translated image, the one or more processors may be configured to determine the first translated image having the distortion of the second image by applying the first relative deformation field to the first image.

The one or more processors may be configured to determine the first retranslated image having the distortion of the first image by applying the second relative deformation field to the first translated image.

The device may be at least one of a mobile phone, a smartphone, a personal digital assistant (PDA), a netbook, a tablet computer, a laptop, a mobile device, a smartwatch, a smart band, smart eyeglasses, a wearable device, a desktop, a server, a computing device, a television (TV), a smart TV, a refrigerator, a home appliance, a door lock, a security device, and a vehicle.

In another general aspect, a processor-implemented method with data processing using a neural network includes: translating, based on a first relative deformation field determined using a first deformation field generator, a first image of a first scene from a distortion of the first image to a distortion of a second image of a second scene; retranslating, based on a second relative deformation field determined using a second deformation field generator, the translated first image from the distortion of the second image to the distortion of the first image; and training the first neural network and the second neural network based on a loss between the retranslated first image and the first image.

The first relative deformation field may correspond to positions of pixels in the second image to which pixels in the first image move such that the first image is translated to have the distortion of the second image.

Either one or both of the first deformation field generator and the second deformation field generator may be a neural network.

In another general aspect, a processor-implemented method with data processing using a neural network includes: performing inference on an input image using an inference model; and training the inference model based on a loss between a result of the inference and a label image, wherein either one or both of the input image and the label image are generated by translating a respective image to a distortion of a target image based on a relative deformation field determined using a trained deformation field generator.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, integers, steps, operations, elements, components and/or populations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1:
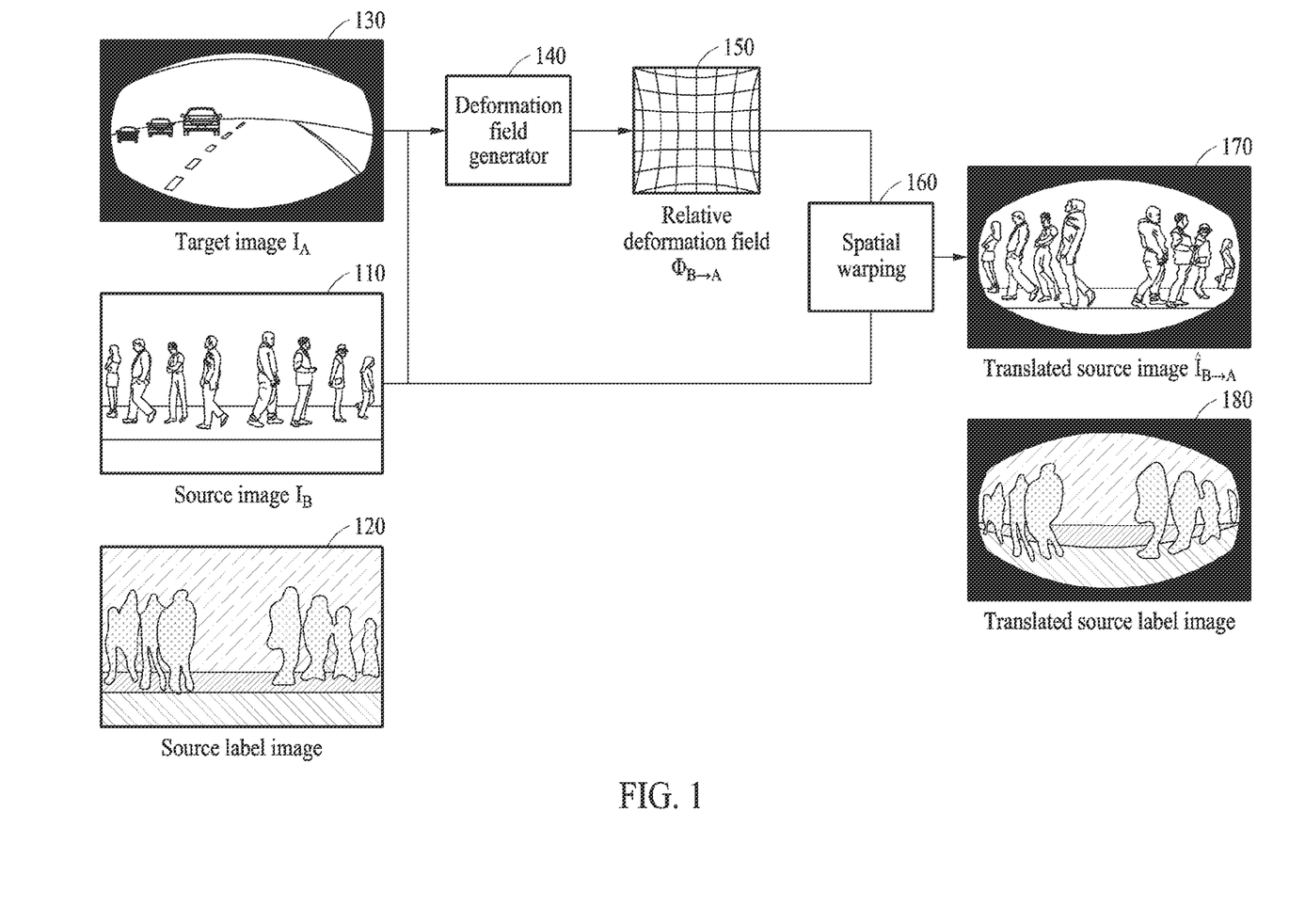
FIG. 1 illustrates an example of generating a translated source image using a deformation field generator.

FIG. 1 illustrates an example of generating a translated source image using a deformation field generator.

In the example of FIG. 1, a source image $I_B$ 110 and a target image $I_A$ 130 that have different deformations or distortions are given.

The source image $I_B$ 110 may be a rectilinear image captured by a general camera, for example, a (non-distorted) planar image without a distortion. The source image $I_B$ 110 may have a source label image 120 corresponding to the source image $I_B$ 110. The source label image 120 may represent a result of classifying or detecting objects included in the source image $I_B$ 110, and may include various types of labels based on an inference operation intended to be performed.

The target image $I_A$ 130 may be a fisheye image captured by a camera including a fisheye lens and may include, for example, a (distorted) image with a distortion. An image captured through a fisheye lens having a field of view (FOV) that exceeds 180 degrees (°) is represented as a two-dimensional (2D) image, and thus there may be inevitably a distortion in the image. Such a distortion may be affected by various parameters of a lens or camera, and thus there may not be a target label image corresponding to the target image $I_A$ 130 having the distortion. However, to train an inference model for the target image $I_A$ 130, the target label image corresponding to the target image $I_A$ 130 may also be used in addition to the target image $I_A$ 130. Hereinafter, generating an image that has a distortion of a target image (e.g., the target image $I_A$ 130) and has also a corresponding label image will be described in detail.

A deformation field generator 140 may be or include a neural network configured to predict a relative deformation field that represents a relative deformation between two input images. The neural network may be represented by or include a mathematical model using nodes and edges. The neural network may be of an architecture of a deep neural network (DNN) and/or an n-layer neural network. The DNN or the n-layer neural network may be or include, for example, a convolutional neural network (CNN), a recurrent neural network (RNN), a deep belief network (DBN), a restricted Boltzmann machine (RBM), and the like.

Referring to FIG. 1, the deformation field generator 140 may predict a relative deformation field $\phi_{B \to A}$ 150 that represents a relative deformation from the source image $I_B$ 110 to the target image $I_A$ 130. The relative deformation field $\phi_{B \to A}$ 150 may represent a position of each pixel in the target image $I_A$ 130 to which each pixel in the source image $I_B$ 110 is to move such that the source image $I_B$ 110 is translated to have the distortion of the target image $I_A$ 130.

Spatial warping 160 may be performed based on the source image $I_B$ 110 and the relative deformation field $\phi_{B \to A}$ 150 (e.g., the spatial warping 160 may be performed on the source image $I_B$ 110 using the relative deformation field $\phi_{B \to A}$ 150). The spatial warping 160 may be an operation of performing a grid-based sampling translation. As a result of the spatial warping 160, a translated source image $I_{B \to A}$ 170 having the distortion of the target image $I_A$ 130 may be generated from the source image $I_B$ 110.

Similarly, by performing the spatial warping 160 by applying the relative deformation field $\phi_{B \to A}$ 150 to the source label image 120, a translated source label image 180 having the distortion of the target image $I_A$ 130 may be generated. The translated source label image 180 may be used along with the translated source image $I_{B \to A}$ 170 to train the inference model for the target image $I_A$ 130.

There may be a sufficient number of annotations (e.g., label images) for a non-distorted rectilinear image such as the source image $I_B$ 110, and thus a sufficient number of annotations for the distortion of the target image $I_A$ 130 may be readily obtained through the spatial warping 160 based on the relative deformation field $\phi_{B \to A}$ 150. Thus, a data processing method and device of one or more embodiments may effectively prevent a considerable amount of cost from being incurred to generate annotations for various distortions.

The foregoing operations may be performed based on the relative deformation field $\phi_{B \to A}$ 150 predicted by the deformation field generator 140, even without information associated with the respective distortions of the source image $I_B$ 110 and the target image $I_A$ 130 (for example, intrinsic and extrinsic parameters and calibration parameters of a camera capturing an image).

The source image $I_B$ 110 and the target image $I_A$ 130 may be unpaired images including different contents and/or scenes. Although the source image $I_B$ 110 and the target image $I_A$ 130 are illustrated as a non-distorted image and a distorted image, respectively, in FIG. 1 for the convenience of description, the foregoing description may also be applied, without limitation, to any case in which a source image is also a distorted image, and the source image has a different distortion from that of a target image and has a corresponding label image. The description provided herein may be applied to various applications using cameras including, for example, a pinhole camera and a fisheye camera.

Hereinafter, training the deformation field generator 140 will be described in detail with reference to FIGS. 2 and 3.

Figure 2:
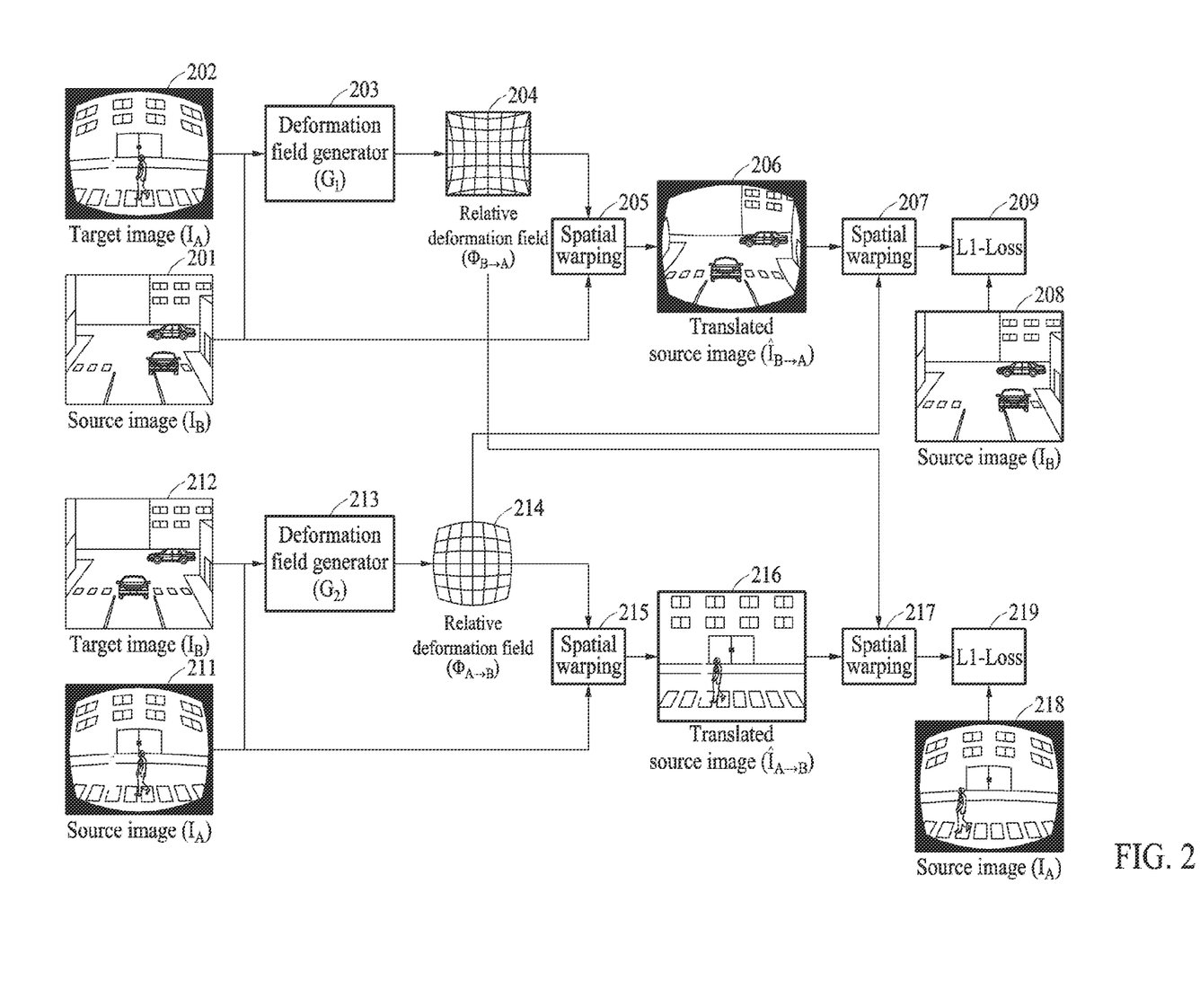
FIGS. 2 and 3 illustrate examples of training a deformation field generator.
Figure 3:
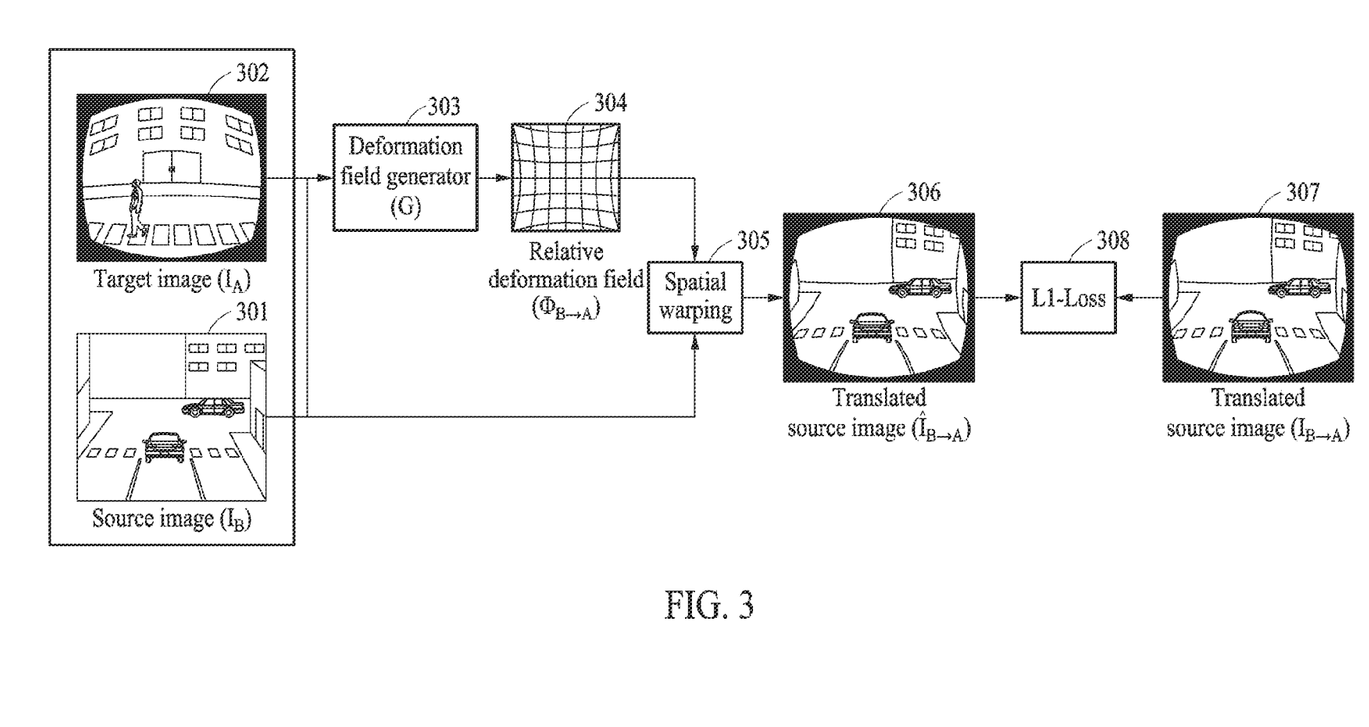

FIGS. 2 and 3 illustrate examples of training a deformation field generator.

Referring to FIG. 2, a deformation field generator $G_1$ 203 and a deformation field generator $G_2$ 213 may be trained based on an inverse deformation relationship without distortion information of two images. For the training of the deformation field generator $G_1$ 203 and the deformation field generator $G_2$ 213, a source image and a target image having different distortions, one of which has a label image, may be used. For example, as illustrated, a source image $I_B$ 201 to be input to the deformation field generator $G_1$ 203 may be a non-distorted planar image having a label image, and a target image $I_A$ 202 to be input to the deformation field generator $G_1$ 203 may be a distorted image not having a corresponding label image. However, examples of a source image and a target image are not limited to the source image $I_B$ 201 and the target image $I_A$ 202. The description provided herein may also be applied to any cases in which there are images having different distortions and one of which has a label image.

The deformation field generator $G_1$ 203 may predict a relative deformation field $\phi_{B \to A}$ 204 that represents a relative deformation from the source image $I_B$ 201 to the target image $I_A$ 202. Subsequently, spatial warping 205 that is based on the source image $I_B$ 201 and the relative deformation field $\phi_{B \to A}$ 204 may be performed, and a translated source image $\hat{I}_{B \to A}$ 206 may thereby be determined. The translated source image $\hat{I}_{B \to A}$ 206 may be an image obtained by translating the source image $I_B$ 201 such that the source image $I_B$ 201 appears to have the distortion of the target image $I_A$ 202 (e.g., such that the translated source image $\hat{I}_{B \to A}$ 206 corresponds to the source image $I_B$ 201 translated or distorted to the distortion of the target image $I_A$ 202).

In addition, spatial warping 207 that is based on the translated source image $\hat{I}_{B \to A}$ 206 and a relative deformation field $\phi_{A \to B}$ 214 may be performed. The relative deformation field $\phi_{A \to B}$ 214 may be predicted by the deformation field generator $G_2$ 213. In contrast to the deformation field generator $G_1$ 203, the deformation field generator $G_2$ 213 may predict the relative deformation field $\phi_{A \to B}$ 214 that represents a relative deformation from a source image $I_A$ 211 that is distorted to a target image $I_B$ 212 that is not distorted. That is, the deformation field generator $G_1$ 203 and the deformation field generator $G_2$ 213 may be in an inverse deformation relationship. Through the spatial warping 207 based on the translated source image $\hat{I}_{B \to A}$ 206 and the relative deformation field $\phi_{A \to B}$ 214, a retranslated source image (not shown) may be determined. The retranslated source image may be an image obtained by retranslating the translated source image $\hat{I}_{B \to A}$ 206 such that the translated source image $\hat{I}_{B \to A}$ 206 appears to have the distortion of the source image $I_B$ 201, that is, for example, an image retranslated into a planar image with a distortion of 0 (e.g., such that the retranslated source image corresponds to the translated source image $\hat{I}_{B \to A}$ 206 translated or distorted to the distortion of the target image $I_B$ 212).

A loss 209 between the retranslated source image and a source image $I_B$ 208 may be calculated, and the deformation field generator $G_1$ 203 and the deformation field generator $G_2$ 213 may be trained such that the loss 209 is minimized. The loss 209 may indicate a difference between the retranslated source image and the source image $I_B$ 208 and may include, for example, an L1-loss, but examples of which are not limited thereto.

A source image and a target image input to the deformation field generator $G_1$ 203 may be input inversely to the deformation field generator $G_2$ 213. The deformation field generator $G_2$ 213 may predict the relative deformation field $\phi_{A \to B}$ 214 that represents the relative deformation from the source image $I_A$ 211 to the target image $I_B$ 212. Subsequently, spatial warping 215 that is based on the relative deformation field $\phi_{A \to B}$ 214 and the source image $I_A$ 211 may be performed, and a translated source image $\hat{I}_{A \to B}$ 216 may be determined. The translated source image $\hat{I}_{A \to B}$ 216 may be an image obtained by translating the source image $I_A$ 211 such that the source image $I_A$ 211 appears to have a distortion of the target image $I_B$ 212 (e.g., such that the translated source image $\hat{I}_{A \to B}$ 216 corresponds to the source image $I_A$ 211 translated or distorted to the distortion of the target image $I_B$ 212). That is, the translated source image $\hat{I}_{A \to B}$ 216 may be an image from which a distortion of the source image $I_A$ 211 is removed as in a planar image with a distortion of 0 such as the target image $I_B$ 212.

Spatial warping 217 that is based on the translated source image $\hat{I}_{A \to B}$ 216 and the relative deformation field $\phi_{B \to A}$ 204 may be performed, and a retranslated source image (not shown) may be determined. The retranslated source image may be an image obtained by retranslating the translated source image $\hat{I}_{A \to B}$ 216 such that the translated source image $\hat{I}_{A \to B}$ 216 appears to have the distortion of the source image $I_A$ 211, that is, for example, an image retranslated into a fisheye image with a distortion (e.g., such that the retranslated source image corresponds to the translated source image $\hat{I}_{A \to B}$ 216 translated or distorted to the distortion of the target image $I_A$ 202).

A loss 219 between the retranslated source image and a source image $I_A$ 218 may be calculated, and the deformation field generator $G_1$ 203 and the deformation field generator $G_2$ 213 may be trained such that the loss 219 is minimized. The loss 219 may indicate a difference between the retranslated source image and the source image $I_A$ 218 and may include, for example, an L1-loss, but examples of which are not limited thereto.

The deformation field generator $G_1$ 203 and the deformation field generator $G_2$ 213 may be trained simultaneously such that the following losses of Equation 1, for example, are minimized using the inverse deformation relationship described above.

$$L1 \to \text{LOSS}(\hat{I}_{B \to A} \cdot \phi_{A \to B}, I_B)$$

$$L1\_\text{LOSS}(\hat{I}_{A \to B} \cdot \phi_{B \to A}, I_A) \qquad \text{Equation 1:}$$

In Equation 1, · denotes spatial warping. For example, $\hat{I}_{B \to A} \cdot \phi_{A \to B}$ denotes the retranslated source image determined through the spatial warping 207, and $\hat{I}_{A \to B} \cdot \phi_{B \to A}$ denotes the retranslated source image determined through the spatial warping 217.

Thus, the deformation field generator $G_1$ 203 and the deformation field generator $G_2$ 213 may be trained to predict a relative deformation field that represents a relative deformation even in a situation where distortion information is not given.

As the training is based on the inverse deformation relationship, initial parameters of the deformation field generator $G_1$ 203 and the deformation field generator $G_2$ 213 may be set to secure training (or learning) stability rather than being set randomly, a non-limiting example of which will be described in detail with reference to FIG. 3.

FIG. 3 illustrates an example of determining an initial parameter of a deformation field generator.

For example, a translated source image $I_{B \to A}$ 307 may be determined from a source image $I_B$ 301 which is a non-distorted planar image, based on a fisheye simulation. A target image $I_A$ 302 which is a distorted fisheye image may be determined from a planar image different from the source image $I_B$ 301 based on the fisheye simulation. The translated source image $I_{B \to A}$ 307 and the target image $I_A$ 302 may be determined based on the fisheye simulation to which the same parameter is applied, and may thus have the same distortion. For another example, the target image $I_A$ 302 may be an image captured by a fisheye camera, and the translated source image $I_{B \to A}$ 307 may be generated from the source image $I_B$ 301 based on a fisheye simulation to which a parameter associated with the camera or a parameter associated with a distortion of the target image $I_A$ 302 is applied. In this example, the translated source image $I_{B \to A}$ 307 and the target image $I_A$ 302 may also have the same distortion.

A deformation field generator G 303 may determine a relative deformation field $\phi_{B \to A}$ 304 that represents a relative distortion from the source image $I_B$ 301 to the target image $I_A$ 302. As spatial warping 305 based on the relative deformation field $\phi_{B \to A}$ 304 and the source image $I_B$ 301 is performed, a translated source image $\hat{I}_{B \to A}$ 306 may be generated. The translated source image $\hat{I}_{B \to A}$ 306 may be an image that is translated from the source image $I_B$ 301 to have the distortion of the target image $I_A$ 302. A loss 308 between the translated source image $\hat{I}_{B \to A}$ 306 and the translated source image $I_{B \to A}$ 307 may be calculated, and the deformation field generator G 303 may be trained such that the loss 308 is minimized. The loss 308 may indicate a difference between the translated source image $\hat{I}_{B \to A}$ 306 and the translated source image $I_{B \to A}$ 307 and may include, for example, an L1-loss, but examples of which are not limited thereto.

An initial parameter of the deformation field generator G 303 may be determined through prior training of the deformation field generator G 303, and the training of the deformation field generator G 303 may be performed based on the initial parameter as described above with reference to FIG. 2.

Although the description provided with reference to FIG. 3 focuses on the deformation field generator G 303 that predicts the relative deformation field $\phi_{B \to A}$ 304 representing a relative deformation from the source image $I_B$ 301 to the target image $I_A$ 302 for the convenience of description, the foregoing description may also be applied to determine an initial parameter of the deformation field generator $G_2$ 213 that predicts the relative deformation field $\phi_{A \to B}$ 214 representing a relative deformation from the source image $I_A$ 211 to the target image $I_B$ 212 as described above with reference to FIG. 2.

Figure 4:
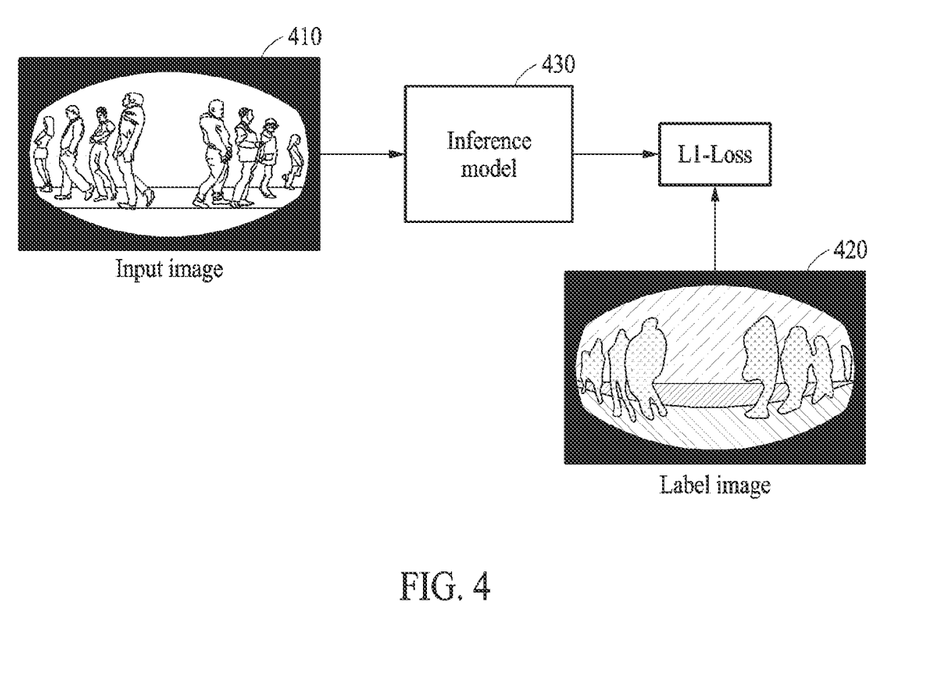
FIGS. 4 through 6 illustrate examples of training an inference model.
Figure 5:
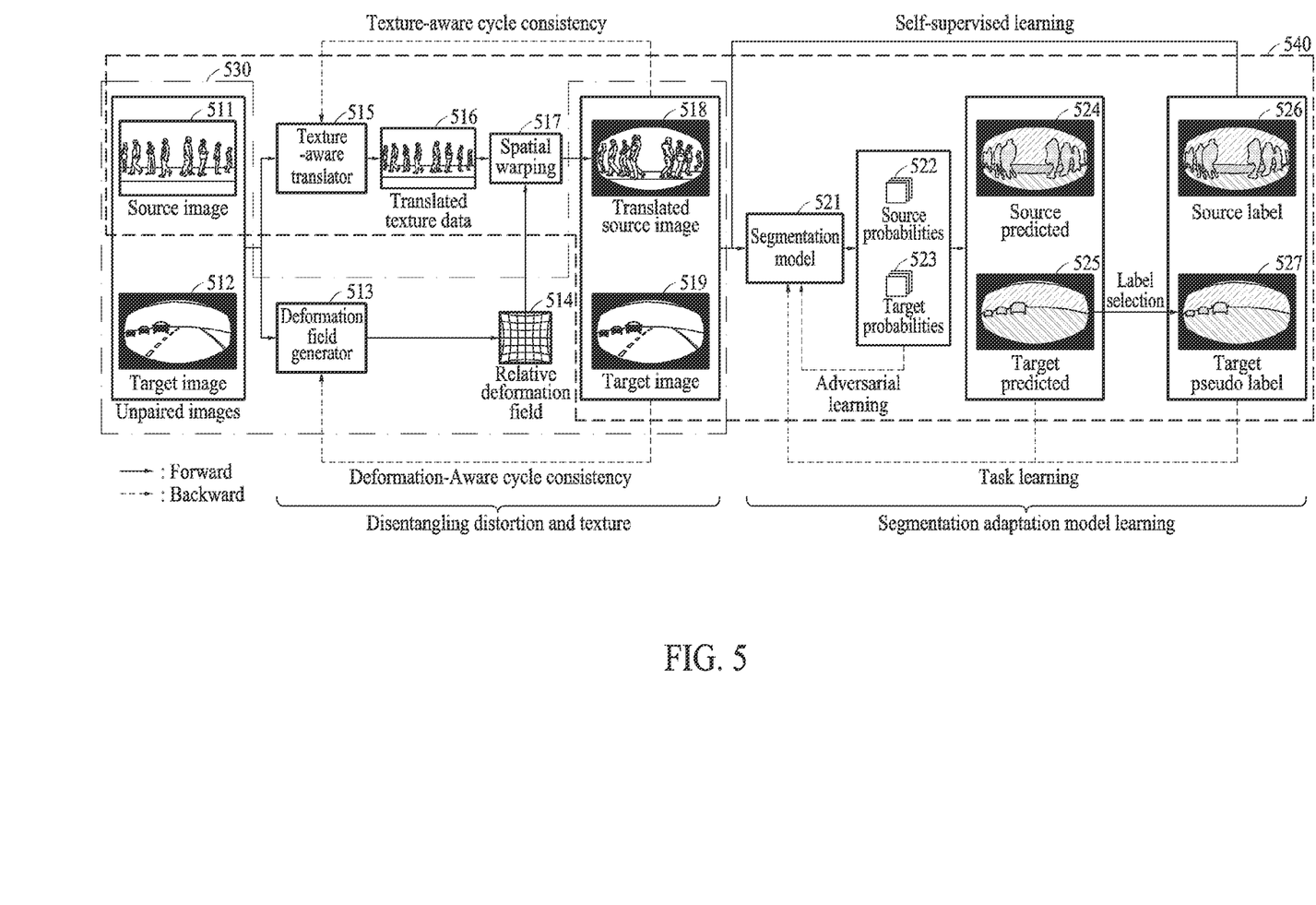
Figure 6:
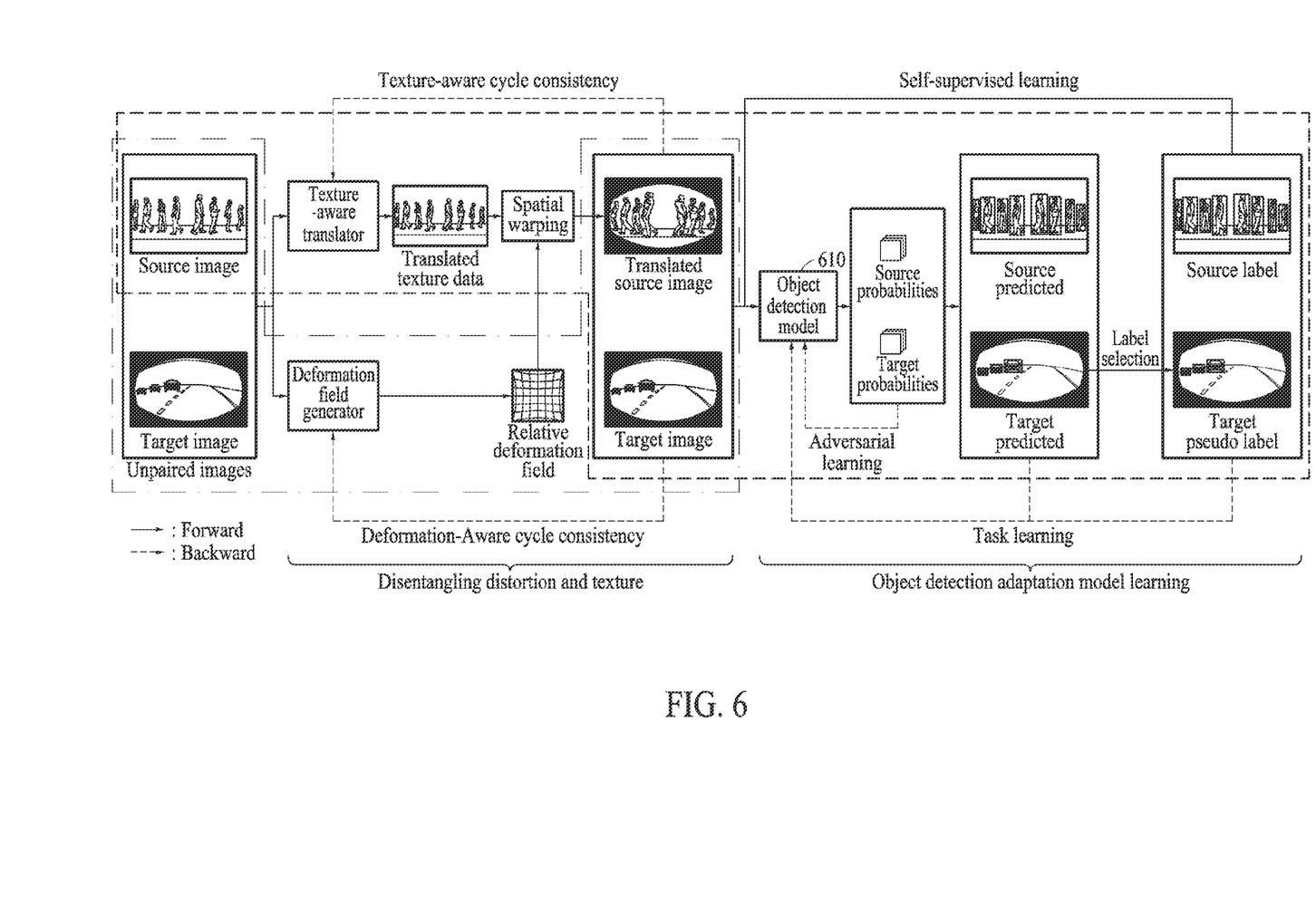

FIGS. 4 through 6 illustrate examples of training an inference model.

A deformation field generator described above may be used to generate training data including a captured image and a corresponding label image, for any distortion. The training data may be used to train an inference model that performs recognition on a distorted image. The inference model may be a neural network that performs an inference on an input image and may include, for example, a segmentation model, an object detection model, and the like. Hereinafter, training an inference model will be described in detail.

Referring to FIG. 4, an inference model 430 may be trained based on an input image 410 and a label image 420.

The input image 410 may be an image that is translated to have the same distortion as a target image intended to be inferred through the inference model 430. The target image may be an image captured through a fisheye lens and may include a distortion formed by the fisheye lens and/or camera. The deformation field generator described above may be used to translate various images having corresponding label images such that the images appear to have the same distortion as the target image. The label image 420 may be an image translated to have the same distortion as the target image and may correspond to the input image 410. The inference model 430 may be trained such that a loss between a result of performing the inference on the input image 410 and the label image 420 is minimized. Thus, the data processing method and device of one or more embodiments may effectively train the inference model 430 that infers the target image without any information associated with the distortion of the target image intended to be inferred or information associated with the camera capturing a corresponding image.

Referring to FIG. 5, a segmentation model 521 (e.g., an inference model) may be trained using a deformation field generator and an unsupervised domain adaptation (UDA). The training of the segmentation model 521 may include a distortion and texture disentangling step and a segmentation adaptation model learning step.

A deformation field generator 513 may predict a relative deformation field 514 that represents a relative deformation from a source image 511 to a target image 512. The source image 511 may be an image having a corresponding label image. The target image 512 may be an image not having a corresponding label image, but having the same distortion as an image to be inferred by the segmentation model 521. An inference target texture-aware translator 515 may determine texture-translated data 516 by recognizing a difference in texture between the source image 511 and the target image 512 and translating a texture (e.g., color and brightness) of the source image 511 into that of the target image 512. Subsequently, spatial warping 517 based on the texture-translated data 516 and the relative deformation field 514 may be performed, and a translated source image 518 may be determined. That is, the translated source image 518 may be an image obtained by translating the source image 511 such that the source image 511 has the distortion and the texture of the target image 512.

The translated source image 518 and a target image 519 may be used to train the segmentation model 521. The segmentation model 521 may be a model that segments objects, for example, humans, roads, vehicles, road signs, and the like, that are included in an input image. The segmentation model 521 may perform an inference on the translated source image 518 and determine source probabilities 522. The segmentation model 521 may determine a source probability for each class intended to be segmented. For example, a first source probability may be a probability that each pixel in the translated source image 518 corresponds to a human being, and a second source probability may be a probability that each pixel in the translated source image 518 corresponds to a road. The number of the source probabilities 522 may be the same as the number of classes to be segmented by the segmentation model 521. Similarly, the segmentation model 521 may determine target probabilities 523 by performing an inference on the target image 519.

Adversarial learning may be performed on the segmentation model 521 based on the source probabilities 522 and the target probabilities 523. Whether a probability output from the segmentation model 521 is based on an inference of the translated source image 518 or on an inference of the target image 519 may be determined by a discriminator (not shown), and the segmentation model 521 may be trained to deceive the discriminator.

A predicted source 524 may indicate a class to which each pixel in the translated source image 518 belongs at a highest probability, and be an image indicating the class having the highest probability among the source probabilities 522. Similarly, a predicted target 525 may be an image indicating a class to which each pixel of the target image 519 belongs at a highest probability.

A source label 526 may be an image obtained by translating a label image corresponding to the source image 511 such that the label image appears to have the same distortion as the target image 512. The segmentation model 521 may be trained based on a difference between the predicted source 524 and the source label 526. The segmentation model 521 may be trained such that the predicted source 524 generated as a result of an inference of the segmentation model 521 becomes similar to the source label 526.

A target pseudo label 527 may be determined by selecting, from the predicted target 525, a label with a threshold value or greater. Thus, uncertain information with a relatively less probability may be removed from the predicted target 525. The segmentation model 521 may be trained based on the target pseudo label 527.

The distortion and texture disentangling step and the segmentation adaptation model learning step may be alternatively and repeatedly performed, or simultaneously performed. Thus, even in the absence of a label, the segmentation model 521 that performs an inference robust against an image having the same distortion as the target image 512 may be trained with a high level of accuracy.

The description provided above with reference to FIGS. 1 through 3 may be applied to operations 530 illustrated in FIG. 5, and operations 540 illustrated in FIG. 5 may be a portion for UDA-based inference model learning.

Referring to FIG. 6, an object detection model 610 may be trained using a deformation field generator and a UDA. What is described above with reference to FIG. 5 may also be applied to the training of the object detection model 610, and thus a more detailed and repeated description of the training of the object detection model 610 will be omitted here for brevity.

By training an inference model as described above, the data processing method and device of one or more embodiments may effectively train the inference model that infers a target image, even when the target image to be inferred has no label, an image different from the target image in terms of distortion and/or texture has a label, and the two images include different scenes without information associated with a distortion between the two images.

Figure 7:
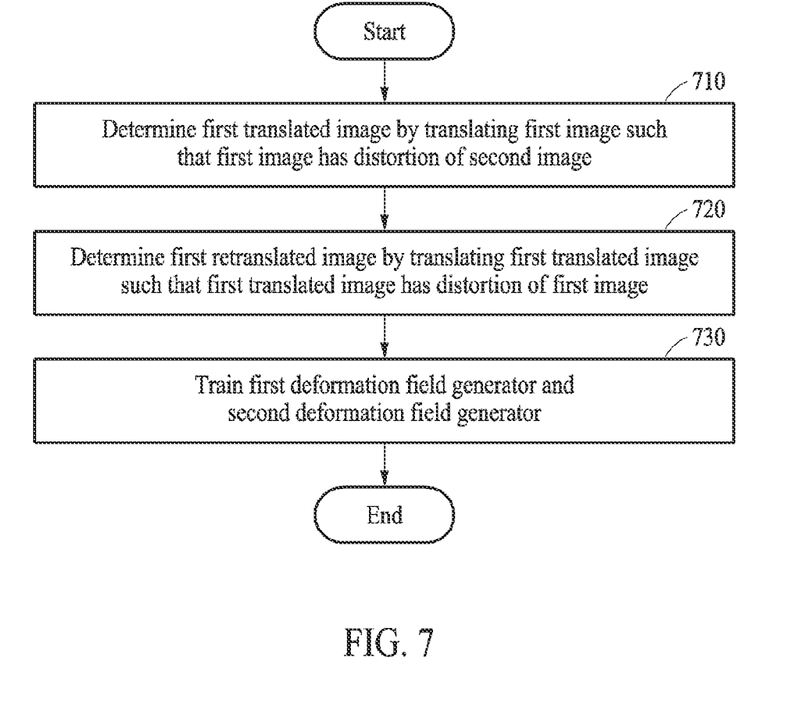
FIG. 7 illustrates an example of a data processing method using a neural network.

FIG. 7 illustrates an example of a data processing method using a neural network.

Operations 710 through 730 to be described hereinafter with reference to FIG. 7 may be performed in sequential order, but not necessarily be performed in sequential order. For example, the operations may be performed in a changed order, or at least two of the operations may be performed in parallel. Operations 710 through 730 may be performed by at least one component (e.g., a processor) of an electronic device (e.g., a data processing device).

In operation 710, the data processing device may determine a first translated image by translating a first image between the first image and a second image that have different distortions such that the first image has a distortion of the second image. The data processing device may determine the first translated image having the distortion of the second image by applying a first relative deformation field to the first image. The first image and the second image are unpaired images including different contents and/or scenes. The second image may have no corresponding label image.

In operation 720, the data processing device may determine a first retranslated image by translating the first translated image such that the first translated image has the distortion of the first image. The data processing device may determine the first retranslated image having the distortion of the first image by applying a second relative deformation field to the first translated image.

In operation 730, the data processing device may train a first deformation field generator configured to determine the first relative deformation field that represents a relative deformation from the first image to the second image, and train a second deformation field generator configured to determine the second relative deformation field that represents a relative deformation from the second image to the first image, based on a loss between the first retranslated image and the first image. The first relative deformation field and the second relative deformation field may have an inverse deformation relationship. The data processing device may train the first deformation field generator and the second deformation field generator through unsupervised learning without information associated with a distortion of each of the first image and the second image.

In addition, the data processing device may determine a second translated image by translating the second mage such that the second image has the distortion of the first image, determine a second retranslated image by translating the second translated image such that the second translated image has the distortion of the second image, and train the first deformation field generator and the second deformation field generator based on a loss between the second retranslated image and the second image.

An initial parameter of the first deformation field generator may be determined through training that is based on a loss between the first translated image and a third translated image obtained from the first image based on a fisheye simulation.

The data processing device may train an inference model for the second image based on the first translated image and a translated label image obtained by translating a label image corresponding to the first image such that the label image has the distortion of the second image. In addition, the data processing device may train the inference model for the second image, based on an UDA using the second image, the translated label image, and a fourth translated image obtained by translating the first image such that the first image has the distortion and texture of the second image.

Thus, as described above, the data processing method and device of one or more embodiments may obtain an inference model that is robust against a distortion using an image having a label and a different distortion characteristic, even when an image to be inferred has no given distortion characteristic and has no label.

Figure 8:
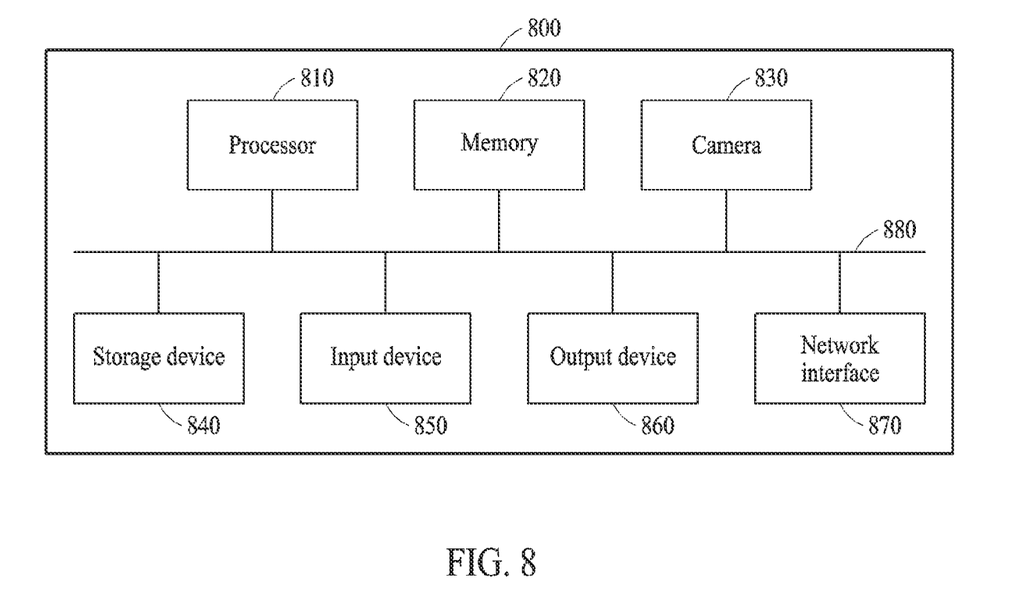
FIGS. 8 and 9 illustrate examples of a data processing device using a neural network.
Figure 9:
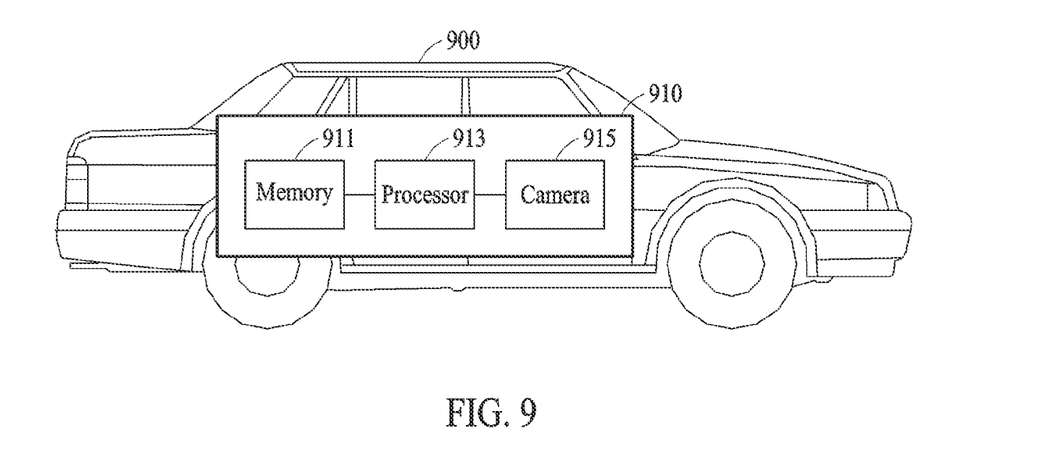

FIGS. 8 and 9 illustrate examples of a data processing device using a neural network.

Referring to FIG. 8, a data processing device 800 may include a processor 810 (e.g., one or more processors), a memory 820 (e.g., one or more memories), a camera 830, a storage device 840, an input device 850, an output device 860, and a network interface 870, which may communicate with one another through a communication bus 880, a peripheral component interconnect express (PCIe), a network on chip (NoC), or the like. The data processing device 800 may be, or may be provided as at least a portion of, for example, a mobile device such as a mobile phone, a smartphone, a personal digital assistant (PDA), a netbook, a tablet computer, and a laptop computer, a wearable device such as a smartwatch, a smart band, and smart eyeglasses, a computing device such as a desktop and a server, a home appliance such as a television (TV), a smart TV, and a refrigerator, a security device such as a door lock, and a vehicle such as an autonomous vehicle and a smart vehicle.

The processor 810 may execute functions and instructions in the data processing device 800. For example, the processor 810 may process instructions stored in the memory 820 or the storage device 840. The processor 810 may perform one or more, or all, of the operations and methods described above with reference to FIGS. 1 through 7. The memory 820 may include a computer-readable storage medium or a computer-readable storage device. The memory 820 may store instructions to be executed by the processor 810 and related information while software and/or application is being executed by the data processing device 800.

The camera 830 may capture an image and/or a video. The storage device 840 may include a computer-readable storage medium or a computer-readable storage device. The storage device 840 may store a greater amount of information than the memory 820 and store the information for a long period of time. The storage device 840 may include, for example, a magnetic hard disk, an optical disc, a flash memory, a floppy disc, or a nonvolatile memory of other types known in relevant technical fields.

The input device 850 may receive an input from a user through a traditional input method using a keyboard and a mouse or through a new input method using a touch input, a voice input, and an image input. The input device 850 may include, for example, a keyboard, a mouse, a touchscreen, a microphone, or any other device that may detect an input from a user and transfer the detected input to the data processing device 800. The output device 860 may provide an output of the data processing device 800 to a user through a visual, auditory, or tactile channel. The output device 860 may include, for example, a display, a touchscreen, a speaker, a vibration generator, or any other device that may provide an output of the data processing device 800 to a user. The network interface 870 may communicate with an external device through a wired or wireless network.

Using the methods described herein, the data processing device 800 of one or more embodiments may obtain an inference model that performs an inference robustly even when an image captured by the camera 830 has any type of distortion and/or texture, and thus perform the inference highly accurately on an image captured by the camera 830.

Referring to FIG. 9, a vehicle 900 may include all types of means of transportation traveling on a road or track. The vehicle 900 may include, for example, an automobile, a motorcycle, and the like, and the automobile may include various types such as a passenger car, a freight vehicle, and a two-wheeled vehicle. The vehicle 900 may also include an autonomous vehicle, an intelligent vehicle, and a vehicle equipped with a driving assistance system. The vehicle 900 may be a vehicle equipped with a data processing device 910.

The data processing device 910 may include a memory 911 (e.g., one or more memories), a processor 913 (e.g., one or more processors), and a camera 915.

The memory 911 may include computer-readable instructions. When the instructions stored in the memory 911 are executed by the processor 913, the processor 913 may perform operations to be described hereinafter. The memory 911 may be a volatile memory or a nonvolatile memory.

The processor 913 may be a device configured to execute instructions or programs, and control the data processing device 910 and may include, for example, a central processing unit (CPU) and/or a graphics processing unit (GPU).

The processor 913 may perform an inference on an image obtained from the camera 915. The processor 913 may perform one or more, or all, of the operations and methods described above with reference to FIGS. 1 through 8. The camera 915 may be a camera configured to capture an image in a direction, for example, a front side, a rear side, and a lateral side, and one or more cameras may be installed in the vehicle 900. For example, four fisheye cameras may be arranged with 90° intervals therebetween in the vehicle 900, and capture images of surroundings of the vehicle 900. The camera 915 installed in the vehicle 900 may vary according to size, shape, and type of the vehicle 900, and thus there may be various distortions and/or textures in images captured by the camera 915. Using the methods described herein, the vehicle 900 of one or more embodiments may obtain an inference model that performs an inference robustly even when an image captured by the camera 915 has any type of distortion and/or texture, and thus perform the inference highly accurately on an image captured by the camera 915.

What is described herein may be applied to a surround view monitor (SVM) system, a rear view camera (RVC) system, an advanced driver assistance system (ADAS), or an in-vehicle infotainment (IVI) chip, without limitation.

The data processing devices, processors, memories, cameras, storage devices, input devices, output devices, network interfaces, communication buses, vehicles, data processing device 800, processor 810, memory 820, camera 830, storage device 840, input device 850, output device 860, network interface 870, communication bus 880, vehicle 900, data processing device 910, memory 911, processor 913, camera 915, and other devices, apparatuses, units, modules, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result.

In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with data processing using a neural network, the method comprising:
   determining a first translated image by translating a first image based on a second image, the first image and a second image having different distortions, such that a distortion of the first translated image corresponds to a distortion of the second image;
   determining a first retranslated image by translating the first translated image such that a distortion of the first retranslated image corresponds to a distortion of the first image; and
   training a first deformation field generator configured to determine a first relative deformation field that represents a relative deformation from the first image to the second image and a second deformation field generator configured to determine a second relative deformation field that represents a relative deformation from the second image to the first image, based on a loss between the first retranslated image and the first image.

2. The method of claim 1, further comprising:
determining a second translated image by translating the second image such that the distortion of the second image corresponds to the distortion of the first image;
determining a second retranslated image by translating the second translated image such that a distortion of the second translated image corresponds to the distortion of the second image; and
training the first deformation field generator and the second deformation field generator based on a loss between the second retranslated image and the second image.

3. The method of claim 1, wherein an initial parameter of the first deformation field generator is determined through training based on a loss between the first translated image and a third translated image determined from the first image based on a fisheye simulation.

4. The method of claim 1, wherein the first relative deformation field and the second relative deformation field have an inverse deformation relationship.

5. The method of claim 1, wherein the determining of the first translated image comprises:
determining the first translated image having the distortion of the second image by applying the first relative deformation field to the first image.

6. The method of claim 1, wherein the determining of the first retranslated image comprises:
determining the first retranslated image having the distortion of the first image by applying the second relative deformation field to the first translated image.

7. The method of claim 1, wherein the first image and the second image are unpaired images comprising either one or both of different contents and different scenes.

8. The method of claim 1, wherein the training of the first deformation field generator and the second deformation field generator comprises:
training the first deformation field generator and the second deformation field generator through unsupervised learning without information associated with the distortions of the first image and the second image.

9. The method of claim 1, further comprising:
training an inference model for the second image based on the first translated image and a translated label image determined by translating a label image corresponding to the first image such that a distortion of the label image corresponds to the distortion of the second image.

10. The method of claim 1, further comprising:
training an inference model for the second image through an unsupervised domain adaptation using the second image, a translated label image determined by translating a label image corresponding to the first image such a distortion of that the label image corresponds to the distortion of the second image, and a fourth translated image determined by translating the first image such that the distortion of the first image corresponds to the distortion and a texture of the second image.

11. The method of claim 1, wherein the second image has no corresponding label image.

12. A non-transitory computer-readable storage medium storing instructions that, when executed by one or more processors, configure the one or more processors to perform the method of claim 1.

13. A processor-implemented method with data processing using a neural network, the method comprising:
determining, using a trained first deformation field generator, a relative deformation field that represents a relative deformation from a source image to a target image based on the source image and the target image that have different distortions; and
determining a translated source image having a distortion of the target image by applying the relative deformation field to the source image,
wherein the first deformation field generator is trained based on a loss between a first retranslated image and a first image, and the first retranslated image is determined by translating a first translated image using a second deformation field generator such that a distortion of the first retranslated image corresponds to a distortion of the first image.

14. A device with data processing, comprising:
one or more processors configured to:
determine a first translated image by translating a first image based on a second image, the first image and a second image having different distortions, such that a distortion of the first translated image corresponds to a distortion of the second image;
determine a first retranslated image by translating the first translated image such that a distortion of the first retranslated image corresponds to a distortion of the first image; and
train a first deformation field generator configured to determine a first relative deformation field that represents a relative deformation from the first image to the second image and a second deformation field generator configured to determine a second relative deformation field that represents a relative deformation from the second image to the first image, based on a loss between the first retranslated image and the first image.

15. The device of claim 14, wherein the one or more processors are configured to:
determine a second translated image by translating the second image such that the distortion of the second image corresponds to the distortion of the first image;
determine a second retranslated image by translating the second translated image such that a distortion of the second translated image corresponds to the distortion of the second image; and
train the first deformation field generator and the second deformation field generator based on a loss between the second retranslated image and the second image.

16. The device of claim 15, wherein an initial parameter of the first deformation field generator is determined through training based on a loss between the first translated image and a third translated image determined from the first image based on a fisheye simulation.

17. The device of claim 14, wherein the first relative deformation field and the second relative deformation field have an inverse deformation relationship.

18. The device of claim 14, wherein, for the determining of the first translated image, the one or more processors are configured to:
determine the first translated image having the distortion of the second image by applying the first relative deformation field to the first image.

19. The device of claim 14, wherein the one or more processors are configured to:

determine the first retranslated image having the distortion of the first image by applying the second relative deformation field to the first translated image.

20. The device of claim 14, wherein the device is at least one of a mobile phone, a smartphone, a personal digital assistant (PDA), a netbook, a tablet computer, a laptop, a mobile device, a smartwatch, a smart band, smart eyeglasses, a wearable device, a desktop, a server, a computing device, a television (TV), a smart TV, a refrigerator, a home appliance, a door lock, a security device, and a vehicle.

* * * * *